Sept. 30, 1958     G. L. HAMMON     2,854,207
REGULATOR VALVES
Filed June 18, 1956
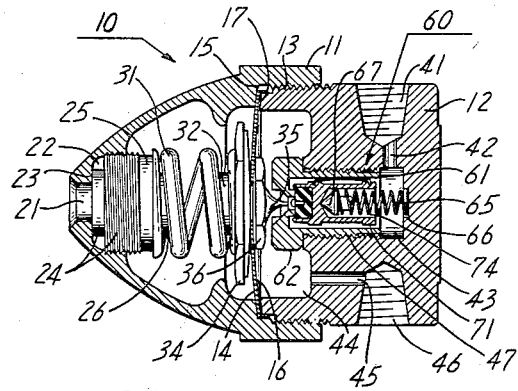
FIG_1_
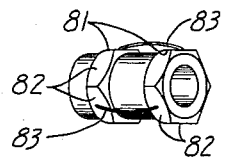
FIG_2_
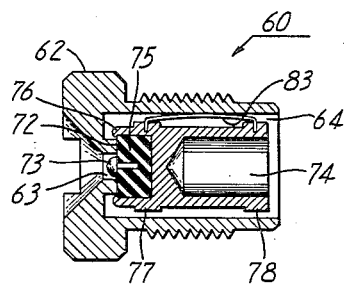     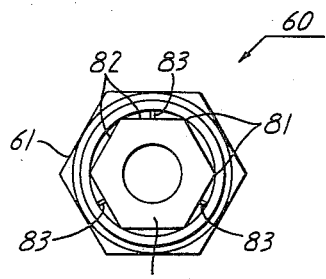
FIG_3_     FIG_4_
INVENTOR.
George L. Hammon.
BY
Robert W. Hampton
ATTORNEY.

2,854,207
REGULATOR VALVES
George L. Hammon, Oakland, Calif.

Application June 18, 1956, Serial No. 592,059

1 Claim. (Cl. 251—64)

The present invention concerns gas pressure regulators, and more particularly concerns an improved valve mechanism for connecting a high pressure chamber to a low pressure chamber in such a regulator.

A gas pressure regulator is employed for receiving gas from a high pressure source, such as a cylinder of compressed oxygen, and expanding the compressed gas in a regulated manner to reduce its pressure to a working level. The expansion may be performed in one or more steps, usually designated "stages," the number of stages being determined largely by the quality of regulation desired and by the difference between source pressure and working pressure. The present invention is described, for the sake of simplicity, in the environment of a single-stage regulator, but it is equally applicable to multiple-stage regulators.

Regulators may be classified further as "preset" or "adjustable." The "preset" regulator, as its name implies, is preadjusted for any given installation to effect a constant, selected reduction of gas pressure. The "adjustable" regulator, on the other hand, is adapted for convenient manual adjustment to effect any desired reduction of gas pressure within its operating range. Again, for simplicity, the present invention is described in the environment of a preset regulator, although it is equally useful in an adjustable regulator.

In reducing the pressure of a gas in any stage of a regulator, the gas is ordinarily passed through a valve cylinder which cooperates with a piston within the cylinder to form passages along the inner cylinder wall. The seating area of the piston at an outlet end of the cylinder forms a variable opening through which controlled quantities of the gas may be transferred from a relatively high pressure chamber into a relatively low pressure chamber. The regulating mechanism automatically moves the piston in either of two directions to control the quantity of gas which flows through the opening at the valve seat, and thereby "regulates" the output gas pressure.

In order to provide smooth regulation of the gas flow, the valve piston should bear firmly against the inner wall of the valve cylinder, but it should be adapted for free sliding action along the cylinder. If the piston does not bear firmly against the cylinder wall, it is subject to lateral vibratory movement, often of a resonant nature, within the cylinder, and the gas flow through the cylinder is consequently not smooth. On the other hand, if the piston is made to bear firmly against the cylinder wall by heavy pressures, for example such as provided by extremely close tolerances, the necessary freedom of sliding action is sacrificed, and the piston tends to stick and then jump from one longitudinal position to another with consequent fluctuations and hunting of the outlet pressure.

Numerous attempts have been made to devise a valve piston with the desirable, but mutually antagonistic qualities of firm bearing and free sliding. For example, in my U. S. Patent No. 2,597,478, there is disclosed and claimed a valve piston which employs respective polygonal collars on opposite ends of the piston. The corners of the polygons form edges across the width of the collars, and these edges bear against the inner cylinder wall in sliding contact therewith. It is obvious that the respective radial dimensions of the collar edges and inner cylinder wall must be extremely precise in order to achieve smooth operation of the piston.

Since the manufacturing precision which, unaided, would produce the desirable sliding action is impractically expensive, the collar edges in this device are deliberately made with some clearance from the cylinder wall. The open or inlet end of the piston is slotted for some distance in a direction parallel to the piston axis, and is then able to be sprung outwardly or inwardly in order to increase or decrease, respectively, the pressure with which the inlet-end collar edges bear against the cylinder wall.

This arrangement has been found to have two principal defects, viz: (1) adjustment of the collar spread on the slotted end of the piston is time-consuming and awkward because each adjustment is a matter of guesswork and the regulator must be taken apart to perform the adjustment; and (2) the collar edges on the unslotted end of the piston are not adjustable and must be made with some clearance; therefore the unslotted, or seat end of the piston is subject to the previously-mentioned lateral vibratory motion, or "chatter" which militates against smooth regulation.

It is therefore a principal object of the present invention to substantially eliminate lateral vibratory motion of the piston in a regulator valve.

Another object of the invention is to fit a piston into a regulator valve firmly but adapted for free sliding motion.

A further object of the invention is to provide a relatively long bearing surface between the inner cylinder wall of a regulator valve sleeve and portions of a valve piston within said sleeve.

Other objects of the invention will be apparent from the following description, reference being made to the accompanying drawings, in which:

Fig. 1 is a side view, mostly in section, of a single-stage preset regulator embodying the present invention;

Fig. 2 is an oblique view of the valve piston;

Fig. 3 is a side view, in section, of the valve assembly; and

Fig. 4 is an end view of the valve section.

General description

Referring to Fig. 1, the regulator in which the present invention is illustrated comprises a housing 10 including a presetting section 11 and a valve section 12. The two sections of the housing are threaded at 13 for mutual engagement, to form a hollow shell. This shell is divided internally into respective presetting and valve sections, or compartments, by a diaphragm 14 which abuts directly against a flange 15 on the inner surface of the presetting section 11 of the housing, and abuts, through a gasket 16, against a flange 17 on the face of the valve section 12 of the housing.

Diaphragm 14 is maintained in an equilibrium position by forces exerted on its opposite sides from the respective presetting and valve compartments of the regulator and, in turn, controls mechanism in the valve compartment to regulate the gas flow, as described hereinafter.

Presetting section

Mechanism in the presetting section of the regulator is employed to exert force on one side of diaphragm 14 to balance the force exerted by gas on the opposite side of the diaphragm. The previously-described section 11 of housing 10 has a hole 21 drilled through one end. Hole 21 is continued by a larger tapped recess 22 in the inner surface of housing section 11. The face of recess 22, extending radially outward from the limits of hole 11, forms an annular shoulder 23 for limiting the movement of an adjusting screw 24 which is threaded into recess 22.

The outer end of a bearing member 25 abuts the inner face of the adjusting screw 24. A stub shaft 26 on the inner end of bearing member 25 supports one end of a diaphragm spring 31. The other end of the diaphragm spring is supported by a second stub shaft 32 formed on a diaphragm plate 34 which is rigidly secured to the diaphragm 14. Thus, spring 31 exerts a pressure against one side of the diaphragm.

The tension of spring 31 may be preset by moving the adjusting screw 24 in one direction or the other within the recess 22 in the presetting section 11 of the regulator housing 19. In order to change the setting of screw 24, the latter member may be formed with a central recess (not shown) shaped to receive any appropriate key, such as an "Allen" wrench, which is inserted through hole 21 in the housing. By presetting spring 31 to the desired tension, the force exerted on the diaphragm 14 is set to predetermine the force which must be exerted by the gas on the opposite side of the diaphragm in the valve compartment in order to maintain a state of equilibrium.

Valve section

The valve section of the regulator includes an inlet 41 which is connected by an inlet duct 42 to a high-pressure chamber 43, and includes an expansion chamber 44 connected by a second duct 45 to an outlet 46. The inlet 41 is adapted to be attached to a source of high-pressure gas, such as a cylinder of compressed oxygen. A valve mechanism, shown generally at 60 in Fig. 1, cooperates with the previously-described diaphragm 14 to permit a controlled flow of gas from the high-pressure chamber 43 to the expansion chamber 44 where the gas is expanded to the desired working pressure. The expanded gas is then fed through duct 45 to the working outlet 46.

The valve mechanism 60 includes a cylindrical sleeve 61 (see also Fig. 3) having its outer surface threaded to fit an opening 47 which separates the high-pressure chamber 43 from the expansion chamber 44. Sleeve 61 has a cylindrical head portion 62 of larger diameter than the threaded portion to form a shoulder which abuts an inner face of the opening 47, thereby limiting the movement of the sleeve toward the high-pressure chamber. The head 62 of sleeve 61 has a hole 63 through its center to connect the expansion chamber 44 to a recess 64, in turn, in sleeve 61. The recess 64 connects hole 63 to the high-pressure chamber 43.

A piston 71 is fitted into the recess 64 in sleeve 61 and has a face portion 72 which seats against an inner valve seat ridge surrounding hole 63. When piston 71 is seated tightly, it closes hole 63 and no gas can flow from the high-pressure chamber 43 to the expansion chamber 44. On the other hand, when the piston is not seated, gas flows from the high-pressure chamber through a nozzle comprising the space separating the seating face of piston 71 and the valve seat ridge of sleeve 61. From the nozzle, the gas flows through hole 63 into the expansion chamber.

A pin 73 in the face portion of piston 71 cooperates with an actuating pin 35 which is integral with a pin base 36, the latter being rigidly connected to the diaphragm 14. When the force exerted on the diaphragm by spring 31 is greater than the force exerted on the opposite side of the diaphragm by the gas in the expansion chamber 44, the center portion of the diaphragm is bent toward the right (as veiwed in Fig. 1), carrying base 36 and pin 35 with it, and thereby moving pin 73 and piston 71 to the right to open hole 63. On the other hand, when the force exerted by the gas in chamber 44 exceeds the force of spring 31, the center of diaphragm 14 is restored toward its normal position, carrying pin 35 out of engagement with pin 73. In the latter case, piston 71 is moved back toward its seating position by the action of a piston spring 65, one end of which engages a recess 66 in housing 10, and the other end of which engages a recess 74 in the piston through a spring button 67.

Referring to Fig. 3, the pin 73 in the seating face of piston 71 is embedded in packing material 75 which is formed preferably of nylon or other non-metallic material. The packing 75 is supported by a thin annular wall 76 which constitutes an extension of the main piston body. The seat end of wall 76 is rolled inwardly to retain the packing 75 in the position shown.

A pair of annular collars 77 and 78 near the respective ends of the piston (see also Figs. 2 and 4) are integral with the piston body and are polygonally shaped to form edges 81 and flats 82. Edges 81 are at a radial distance from the longitudinal axis of piston 71 such that they form a sliding fit with the inner wall of the valve sleeve 61. The piston body is preferably turned from hexagonal stock, thereby providing six edges 81 and six flats 82, although numerous other collar shapes may be employed within the scope of the present invention.

Alternate and corresponding flats 82 of the two collars 77 and 78 are drilled radially inwardly to receive the ends of respective wires 83. The portion of each wire 83 which extends between the holes drilled in its corresponding flats is slightly longer than the linear separation between the holes, and each wire 83 is therefore slightly bowed to form a spring. When piston 71 is inserted into the valve sleeve 61, springs 83 bear against the inner wall of the sleeve for a longitudinal distance which substantially equals the linear separation of the holes in corresponding flats 82 of collars 77 and 78. This bearing spring arrangement has been found to produce a firm but freely-sliding contact between the piston and the valve sleeve. Because of the relatively great longitudinal distance throughout which wires 83 are in contact with sleeve 61, there is substantially no lateral vibration, or chatter, of the piston within the sleeve.

It will be readily apparent that the bearing springs may be formed of material of numerous cross-sectional shapes, and that the number of such springs may be different from the three shown in the accompanying drawings by way of illustration.

The means for adjusting the diaphragm spring 31 (Fig. 1) comprising the internally adjustable screw 24 is claimed in my co-pending continuing-in-part application Serial No. 723,328, filed March 24, 1958.

I claim:

A regulator valve comprising a sleeve member having a head at one end, said head being provided with a bore, and said sleeve member having a longitudinal cylindrically-walled recess at the other end, said recess extending to the head end to form a seat extending around said bore; a piston having a cylindrical body for cooperation with said seat, said body having respective annular polygonal collars adjacent the ends thereof, each collar having a plurality of edges and a plurality of flats, the edges of said collars providing contact with the wall of said recess, certain corresponding flats on said collars being provided with respective holes extending radially inwardly from said flats, and a respective wire member having its opposite ends inserted into the holes on corresponding pairs of said flats, the portion of one of said wires extending outside of its related pair of holes has a length but slightly greater than the linear distance separating said related pair of holes, so that said wires are slightly bowed outwardly of said sleeve member, said wire bearing against the wall of the recess for a longitudinal distance which substantially equals the linear separation of the holes in corresponding flats.

References Cited in the file of this patent

UNITED STATES PATENTS

| | | |
|---|---|---|
| 2,232,018 | Wright | Feb. 18, 1941 |
| 2,597,178 | Hammon | May 20, 1952 |